(12) United States Patent
Nakano et al.

(10) Patent No.: US 7,228,049 B2
(45) Date of Patent: Jun. 5, 2007

(54) OPTICAL FIXED ATTENUATOR AND PROCESS AND APPARATUS FOR PRODUCING THE SAME

(75) Inventors: Masakazu Nakano, Shizuoka (JP); Makiko Miura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 420 days.

(21) Appl. No.: 10/608,211

(22) Filed: Jun. 30, 2003

(65) Prior Publication Data

US 2004/0042758 A1    Mar. 4, 2004

(30) Foreign Application Priority Data

Aug. 30, 2002    (JP) .............................. 2002-255769

(51) Int. Cl.
   *G02B 6/00*    (2006.01)
(52) U.S. Cl. ......................................... 385/140; 385/96
(58) Field of Classification Search ............ 385/95–99, 385/140
   See application file for complete search history.

(56) References Cited

U.S. PATENT DOCUMENTS

| 4,557,557 | A |   | 12/1985 | Gleason et al. ........... 350/96.21 |
|---|---|---|---|---|
| 5,301,252 | A | * | 4/1994 | Yanagawa et al. ............ 385/96 |
| 5,875,277 | A |   | 2/1999 | Izawa et al. ................. 385/140 |
| 5,917,985 | A | * | 6/1999 | Im .............................. 385/140 |
| 6,097,426 | A | * | 8/2000 | Esmaeili ...................... 348/90 |
| 6,464,410 | B1 | * | 10/2002 | Sahinci et al. ................. 385/98 |
| 6,676,307 | B1 | * | 1/2004 | Yang et al. .................... 385/96 |

FOREIGN PATENT DOCUMENTS

| JP | 7-49422 | 2/1995 |
|---|---|---|
| JP | 7-104130 | 4/1995 |
| JP | 8-122531 | 5/1996 |
| JP | 9-145928 | 6/1997 |
| JP | 10-123326 | 5/1998 |
| JP | 10-133021 | 5/1998 |
| JP | 10-282341 | 10/1998 |
| JP | 11-305046 | 11/1999 |
| JP | 2000-131625 | 5/2000 |

\* cited by examiner

*Primary Examiner*—Sung Pak
(74) *Attorney, Agent, or Firm*—Armstrong, Kratz, Quintos, Hanson & Brooks, LLP.

(57) ABSTRACT

A technique for manufacturing optical fixed attenuators in which two fibers are axially cojoined using fusion splicing. The spliced fibers are then captured in either a splice protection splint or cylindrical ferrule that can be housed in an optical adapter. In this process for producing the attenuator, the fusion splicing is preceded by a deformation of the mode field diameters of the ends of the fibers with the cleaning arc function of the splicing unit. The resulting attenuation of the splice is dependent on the amount of deformation of the fiber core and mode field diameter. Such a technique enables precision attenuation with very low wavelength dependent loss to be fabricated. The performance of Dense Wavelength Division Multiplexing systems, as well as test facilities and individual optical components can be improved by the use of such attenuators.

17 Claims, 4 Drawing Sheets

OPTICAL FIXED ATTENUATOR AND PROCESS AND APPARATUS FOR PRODUCING THE SAME

BACKGROUND OF THE INVENTION (1) Field of the Invention

The present invention relates to optical fixed attenuators that can be formed by axially joining the ends of two optical fibers by fusion splicing. The loss of the splice can be controlled which allows it to be used to attenuate the power of an optical signal in a transmission line. The present invention relates to the process and apparatus for producing this attenuator.

(2) Description of the Related Art

An optical communication network normally consists of multiple fiber lines in each of which one or more individual optical signals are transmitted. If more than one wavelength of light is used to transmit multiple signals through a single fiber, the technique is referred to as wavelength division multiplexing (WDM). Recently, WDM systems having in excess of 100 individual signals have been employed in order to increase the transmission capacity. Such systems require precise balance between the transmitted powers of the individual signals. Discrete optical fixed attenuators are the technology of choice for the purpose of balancing this transmitted power. Furthermore, the total optical signal power transmitted in one optical fiber has increased because the total optical power is the sum of the power contained in the various optical signals that are transmitted in that optical fiber. This can leave the system susceptible to signal degradations caused by nonlinear optical effects. Attenuators are installed in a transmission line to minimize or eliminate these effects.

Based on previous technologies, there are at least common five types of optical fixed attenuators as follows:

1. An optical fixed attenuator in which two optical fibers are fusion spliced by a technique which controls the transverse core offset, as disclosed in Japanese Patent Application Laid-open No. H7-49422, H8-122531, H9-145928 and H10-123326;
2. An optical fixed attenuator representing an improvement on type (1) in which an additional electric discharge is applied to the fusion splice point, as disclosed in Japanese Patent Application Laid-open No. 2000-131625;
3. An optical fixed attenuator in which a different material having different light transmittances or a different fiber having different characteristics is inserted between two optical fibers, as disclosed in Japanese Patent Application Laid-open No. H7-104130, H10-133021 and H10-282341;
4. An optical fixed attenuator in which light absorbing transition metal ions (for example, $Co^{2+}$) are doped in an optical fiber core; and
5. An optical fixed attenuator in which the forward distance during splicing of an optical fiber is controlled on a basis of a correlation that exists between the forward distance and splice loss, as disclosed in Japanese Patent Application Laid-open No. H11-305046.

However, each of the techniques for the producing the optical attenuator as described above has one or more of the following drawbacks:

Process 1: it is necessary to control the transverse optical fiber core offset between the optical fibers precisely in order to obtain the desired optical attenuation;

Process 2: the attenuator produced by this method has a high wavelength dependence.

Process 3: it is necessary to perform two splices in order to insert the different fiber type;

Process 4: it is necessary to dope the fiber with light absorbing transition metal ions in a high enough concentration in the optical fiber core in order to achieve the desired optical attenuation; and Process 5: The attenuator produced by this method has a high wavelength dependence.

SUMMARY OF THE INVENTION

The present invention is a process for producing discrete, optical fixed attenuators based on a high loss fusion splice. The fiber fusion splice is performed following deformation of the fiber core and MFD through the action of either the cleaning arc or the prearc function of the fusion splicing machine. The amount of deformation required to achieve the desired attenuation is calculated based on a relationship that exists between the amount of deformation and the splice loss. Finally, as illustrative embodiments of the invention, the splice may be captured within a fiber splice protection sleeve for use in a fiber jumper, or within a ferrule for use in an adapter as an attenuator component.

In order to attain the objective as described above, the present invention is to provide an optical fixed attenuator formed by fusion splicing ends of two parts of optical fibers to each other and disposed in an optical signal transmission line so as to manage light intensity of an optical signal being transmitted in the optical signal transmission line to a constant value, wherein the optical fixed attenuator is formed by fusion splicing said ends of two optical fibers to each other, each said end being deformed in advance so that a mode field diameter of each said end is different from a mode field diameter of a portion of the optical fiber except said end, and quantity of the deformation of said end introduced in advance is set to be a quantity required to attain a specific optical attenuation (i.e., specific quantity of optical attenuation) after the fusion splicing.

As for the construction described above, there is a two-step deformation comprising a pre-deformation of each end of the fibers and a deformation thereof upon the following fusion splicing. Therefore, an optical fixed attenuator, in which the wavelength-dependency is very small, can be obtained at a low cost without complicated work such as doping of light absorbable transition metal ions into a core of an optical fiber and highly precise control of the transverse core offset between the spliced fibers.

Further, since the pre-deformation of each end of the fibers is carried out simultaneously with the removal of dust or pre-heating for melting the ends of the fibers before the fusion splicing and thereafter the ends of the fibers are fusion spliced, the number of the discharge process for the deformation is prevented from being increased, the optical fixed attenuator can be produced at a low cost, and the manufacture yield of the attenuator can be prevented from being deteriorated since the position of the fusion splicing is only one position.

The present invention is also to provide a method for producing an optical fixed attenuator comprising an electric discharge step for removing dust adhered on each end surface and its vicinity of two optical fibers before ends of the two optical fibers are fusion spliced to each other so as to form the optical fixed attenuator, wherein quantity of the electric discharge for removing dust is controlled to be a quantity required to deform said end of the optical fiber in advance so that a mode field diameter of each said end of the optical fiber is different from a mode field diameter of a portion of the optical fiber except said end and each said end is deformed with a quantity of deformation required to attain a specific optical attenuation (i.e., specific quantity of optical attenuation) after the fusion splicing between said ends of the optical fibers.

As for the construction described above, there is a two-step deformation consisting of a pre-deformation of each end of the fibers and a deformation thereof upon the following fusion splicing. Therefore, an optical fixed attenuator, in which the wavelength-dependency is very small, can be obtained at a low cost without complicated work such as doping of light absorbable transition metal ions into a core of an optical fiber and highly precise control of the transverse core offset between the spliced fibers.

Further, since the pre-deformation of each end of the fibers is carried out simultaneously with the removal of dust or pre-heating for melting the ends of the fibers before the fusion splicing and thereafter the ends of the fibers are fusion spliced, the number of the discharge process for the deformation is prevented from being increased, the optical fixed attenuator can be produced at a low cost, and the manufacture yield of the attenuator can be prevented from being deteriorated since the position of the fusion splicing is only one position.

The present invention is also to provide a process for producing an optical fixed attenuator comprising a preheating step for melting ends of two optical fibers before said ends of the two optical fibers are fusion spliced to each other so as to form the optical fixed attenuator, wherein quantity of the preheating is controlled to be a quantity required to deform said end of the optical fiber in advance so that a mode field diameter of each said end of the optical fiber is different from a mode field diameter of a portion of the optical fiber except said end and each said end is deformed with a quantity of deformation required to attain a specific optical attenuation after the fusion splicing between said ends of the optical fibers.

Preferably, the quantity of deformation required to attain a specific optical attenuation is computed on the basis of a correlation between a quantity of deformation of said end calculated in advance and an attenuation due to the fusion splicing for a fusion spliced part of said ends.

With the construction described above, the deformation quantity for the pre-deformation of each end of the fibers and simultaneously for the removal of dust can be easily determined and each end of the fibers can be precisely deformed with the deformation quantity required to attain the desired optical attenuation upon the pre-deformation.

The present invention is also to provide an apparatus for producing an optical fixed attenuator, by which an electric discharge is carried out for removing dust adhered on each end face and its vicinity of two optical fibers, and thereafter ends of the two optical fibers are fusion spliced to each other so as to form the optical fixed attenuator, wherein quantity of the electric discharge for removing dust is set adjustable in a range including at least a quantity required to deform each said end of the optical fiber in advance so that a mode field diameter of each said end of the optical fiber is different from a mode field diameter of a portion of the optical fiber except said end and each said end is deformed with a quantity of deformation required to attain a specific optical attenuation after the fusion splicing between said ends of the optical fibers.

Preferably, the apparatus for producing an optical fixed attenuator comprises:

first computing means 23A for computing the quantity of the electric discharge for removing dust required to deform said each end of the optical fiber with the quantity of deformation required to attain the specific optical attenuation on the basis of a correlation between a quantity of deformation of said end calculated in advance and an attenuation due to the fusion splicing for a spliced part of said ends; and first adjusting means 23B for adjusting quantity of the electric discharge for removing dust to the quantity of the electric discharge computed by the first computing means 23A.

Preferably, the apparatus for producing an optical fixed attenuator comprises:

second computing means 23C for computing the quantity of the preheating required to deform said end of the optical fiber with the quantity of deformation required to attain the specific optical attenuation on the basis of a correlation between a quantity of deformation of said end calculated in advance and an attenuation due to the fusion splicing for a spliced part of said ends; and second adjusting means 23D for adjusting said quantity required to deform said end of the optical fiber in advance to the quantity of the preheating computed by the second computing means 23C.

The optical fixed attenuator and the process and the apparatus for producing the optical fixed attenuator according to the present invention is especially effective when they are applied to two optical fibers, which have the same kind, that is, the same mode field diameter (MFD) or the same core diameter.

DESCRIPTION OF THE PREFERRED EMBODIMENTS

In this section, preferred embodiments of the present invention will be described with reference to the above drawings.

Figure 1:
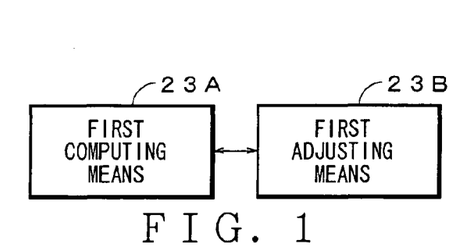
FIG. 1 shows the basic components of an apparatus for producing an optical fixed attenuator according to the present invention.

FIG. 1 shows the basic components of an apparatus for producing an optical fixed attenuator according to the present invention. As shown in FIG. 1, on the basis of a correlation between the deformation quantity of the ends of the fibers and the attenuation for the fusion spliced part, the discharge quantity required to deform each end of the fibers with the deformation quantity required to attain the desired optical attenuation is computed by the first computing means 23A. The discharge for removing dust, which is carried out prior to the fusion splicing between the ends of the two optical fibers, is carried out with the discharge quantity computed by the first computed means 23A, thereby a pre-deformation of each end of the fibers is carried out with the deformation quantity required to attain the desired optical attenuation simultaneously with the removal of dust.

The present invention is also to provide an apparatus for producing an optical fixed attenuator, by which a preheating is carried out for melting ends of two optical fibers before said ends of the two optical fibers are fusion spliced to each other so as to form the optical fixed attenuator, wherein quantity of the preheating is set adjustable in a range including at least a quantity required to deform said end of the optical fiber in advance so that a mode field diameter of each said end of the optical fiber is different from a mode field diameter of a portion of the optical fiber except said end and each said end is deformed with a quantity of deformation required to attain a specific optical attenuation after the fusion splicing between said ends of the optical fibers.

Figure 2:
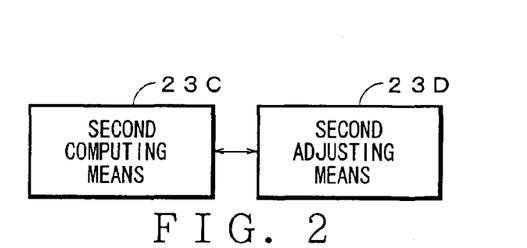
FIG. 2 also shows the basic components of an apparatus for producing an optical fixed attenuator according to the present invention.

With the apparatus described above, as shown in FIG. 2, on the basis of a correlation between the deformation quantity of the ends of the fibers and the attenuation for the fusion spliced part, the heating quantity required to deform each end of the fibers with the deformation quantity required to attain the desired optical attenuation is computed by the second computing means 23C. The pre-heating for melting each end of the fibers, which is carried out prior to the fusion splicing between the ends of the two optical fibers, is carried out with the heating quantity computed by the second computed means 23C, thereby a pre-deformation of each end of the fibers is carried out with the deformation quantity required to attain the desired optical attenuation simultaneously with the pre-heating for melting each end of the fibers before fusion splicing.

Figure 3:
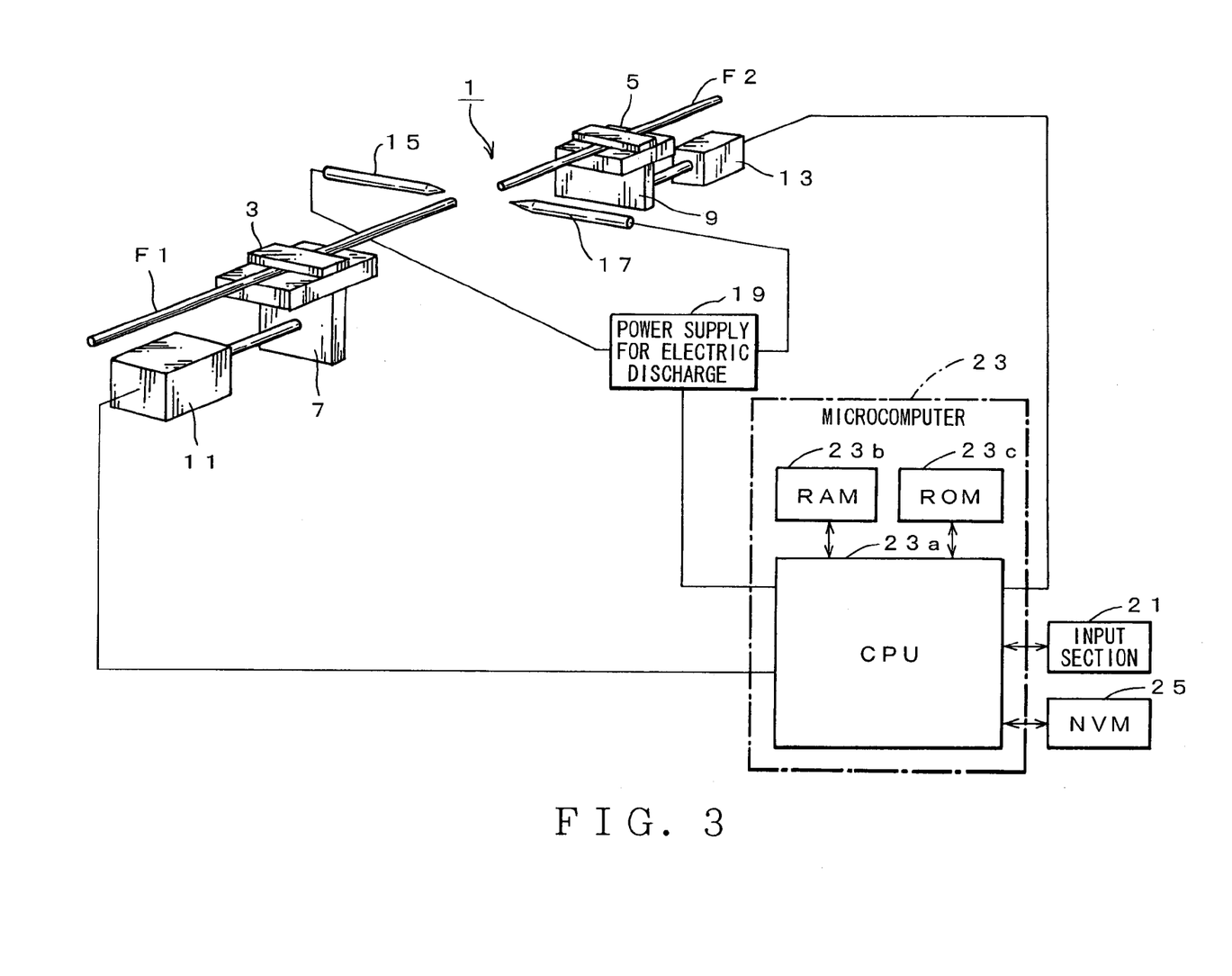
FIG. 3 shows an overview of an apparatus for producing an optical fixed attenuator according to the present invention.

FIG. 3 is the block diagram showing an overview of apparatus 1 which in this particular case has been used for producing the optical fixed attenuator. The apparatus has holders 3 and 5 for setting the optical fibers; sliders 7 and 9 for supporting holders 3 and 5; motors 11 and 13 for moving the sliders 7 and 9 in the direction of the optical axis of the set fibers; electrodes 15 and 17 oriented perpendicular to the direction of the optical axis of the set fibers; a power supply 19 for producing a discharge by applying a high voltage between the electrodes 15 and 17; an input section 21 consisting of input keys and a liquid crystal display (LCD); and a microcomputer 23 for controlling the splicing process.

The input keys of the input section 21 are used for setting the value of parameters that govern the splice characteristics, including: the wavelength, the fiber geometry (for example, clad diameter, MFD etc.) the targeted splice loss, and the fusion arc intensity and duration parameters, to perform the splicing process.

The inputted values can be confirmed on the LCD of the input section 21.

The microcomputer 23 has a CPU 23a, a RAM 23b and a ROM 23c. The CPU 23a is connected to the RAM 23b, the ROM 23c, the motors 11 and 13, the power supply 19, the input section 21, and nonvolatile memory (NVM) 25.

The RAM 23b has a data storage area and a work area for various processes. The ROM 23c stores a control program to make CPU 23a carry out various processes.

The NVM 25 stores fusion splicing patterns corresponding to the parameters from the input section 21, and cleaning discharge patterns corresponding to the inputted targeted splice loss.

Some parameters pertaining to the splicing conditions (such as the forward distance for standard low loss splicing) do not significantly affect the optical attenuation of the splice. For these parameters, the default values for standard low loss splices stored in ROM 23c are used.

Figure 4:
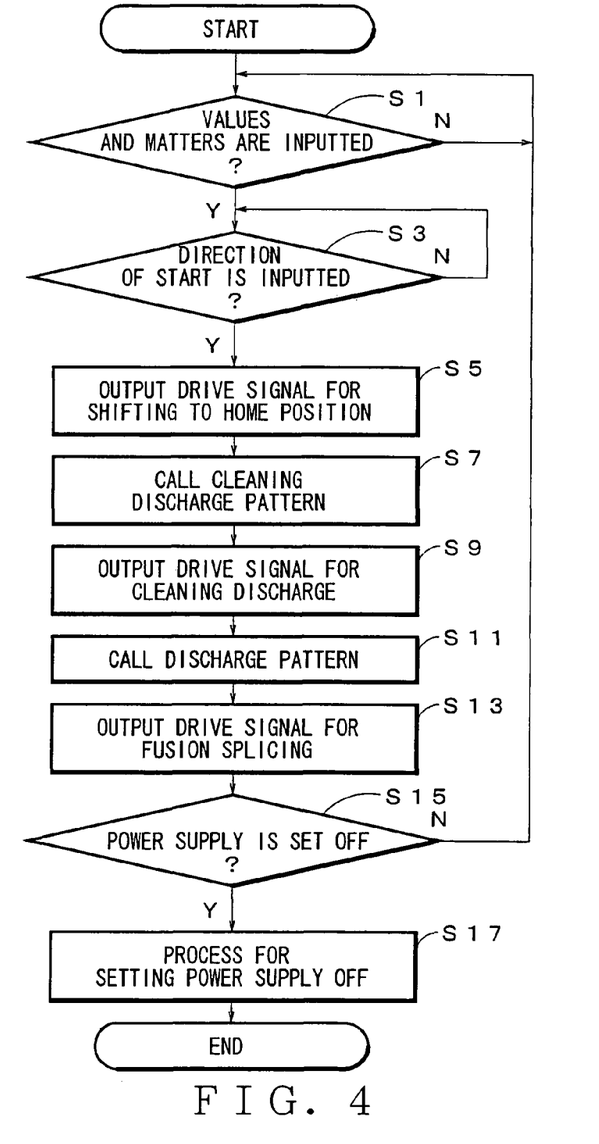
FIG. 4 shows a flowchart of a particular process for producing the fixed value optical attenuating splice using a CPU 23a according to a program stored in RAM 23c as shown in FIG. 3.

The following section will describe the CPU 23a process based on the program stored in ROM 23c with reference to the flowchart shown in FIG. 4.

Step S1. The fibers are assumed to be set in the holders 3 and 5 of FIG. 3 prior to commencement of the splicing program. When electric power is supplied to microcomputer 23, CPU 23a checks whether the parameters governing the fusion splicing process have been received from input section 21. If not (N at step S1) step S1 is repeated until all the parameters have been received.

Step S3. When all parameters have been received (Y at step S1), CPU 23a checks whether the start of the splicing process has been requested by the start key of input section 21.

If not (N at step S3) step S3 is repeated until the start of the process is requested.

Step S5. Following receipt of the start command (Y at step S3), CPU 23a outputs a signal to motors 11 and 13 to move holders 3 and 5 to their home positions, which is the furthest distance between the two holders within the limit of sliders 7 and 9.

Step S7. CPU 23a then loads the cleaning discharge pattern from NVM 25 and outputs appropriate signals to motors 11 and 13 and power supply 19 to perform the cleaning arc discharge based on the parameters loaded at the beginning of step S7.

Step S9. The bare fiber end faces which remain set in holders 3 and 5 are brought together to a specific distance as determined by the parameters downloaded in step S7. Then the discharge is applied from electrodes 15 and 17 with duration and intensity specified by the cleaning discharge pattern loaded in step S7.

Step S11. Following step S9, CPU 23a loads the fusion splicing program stored in NVM 25.

Step S13. CPU 23a outputs a signal to the motors 11 and 13 and power supply 19 to perform splicing based on the parameters loaded in step S11. Simultaneous with the arc discharge from electrodes 15 and 17, the bare fiber end faces set in the holders 3 and 5 are i) overlapped a specific distance; ii) held in position a specified duration; iii) separated a specific distance.

Step S15. CPU 23a checks whether power supply 19 has been shut off. If not (N at step S15), it returns step S1; if yes (Y at step S15), the splicing process is finished.

If we break down the splicing process into a computing sub process, referred to as 23A, and an adjustment sub process, referred to as 23B then in the above explanation step S7 corresponds to the first action in 23A for computing the amount of the cleaning arc discharge, which is described in the claims section, and step S9 corresponds to the first adjustment action of 23B, for adjusting the amount of the cleaning arc discharge computed by the first computing action.

In the following section we explain in detail the procedures for splicing and the action of the apparatus which we used for our invention, whose construction is described above.

As a first step for making the optical fixed attenuator, the bare fibers F1 and F2 whose end faces are prepared according to standard splicing protocol procedure (which includes stripping the coating material from the fibers and cleaning the coating dust from the fiber surface by hand wiping or ultrasonic cleaning with liquid solvent) are set on the fiber holders 3 and 5 (or directly on the apparatus). Then the numerical values of the parameters which are required to determine the details of the fusion splice, such as cladding diameter, MFD, operating wavelength and targeted splice loss, are entered into input section 21. Next, a fusion splice program which is chosen based on the information entered previously, and which consists of several parameters such as the gap between the fiber end faces, the arc discharge duration, the arc discharge intensity, the forward distance and the pull distance, is called from the table of fusion splicing patterns stored in NVM 25. Simultaneously, the cleaning discharge pattern calculated by inputted information is called from the table of cleaning discharge patterns stored in NVM 25. Upon initiation of the splicing procedure by the action of the start key of the input section 21, the fiber holders 3 and 5 into which are set the bare fibers F1 and F2, are shifted to a home position by the motors 11 and 13 which move sliders 7 and 9. Next, the fiber end faces, still set in the holders 3 and 5 are moved to the cleaning discharge position (which should ideally be set as determined in the above calculation) by the motion of sliders 7 and 9 which are moved by motors 11 and 13, (shown in step 1 in FIG. 5). When the fiber end faces reach the cleaning discharge position, the cleaning arc is applied to the fibers.

Figure 5:
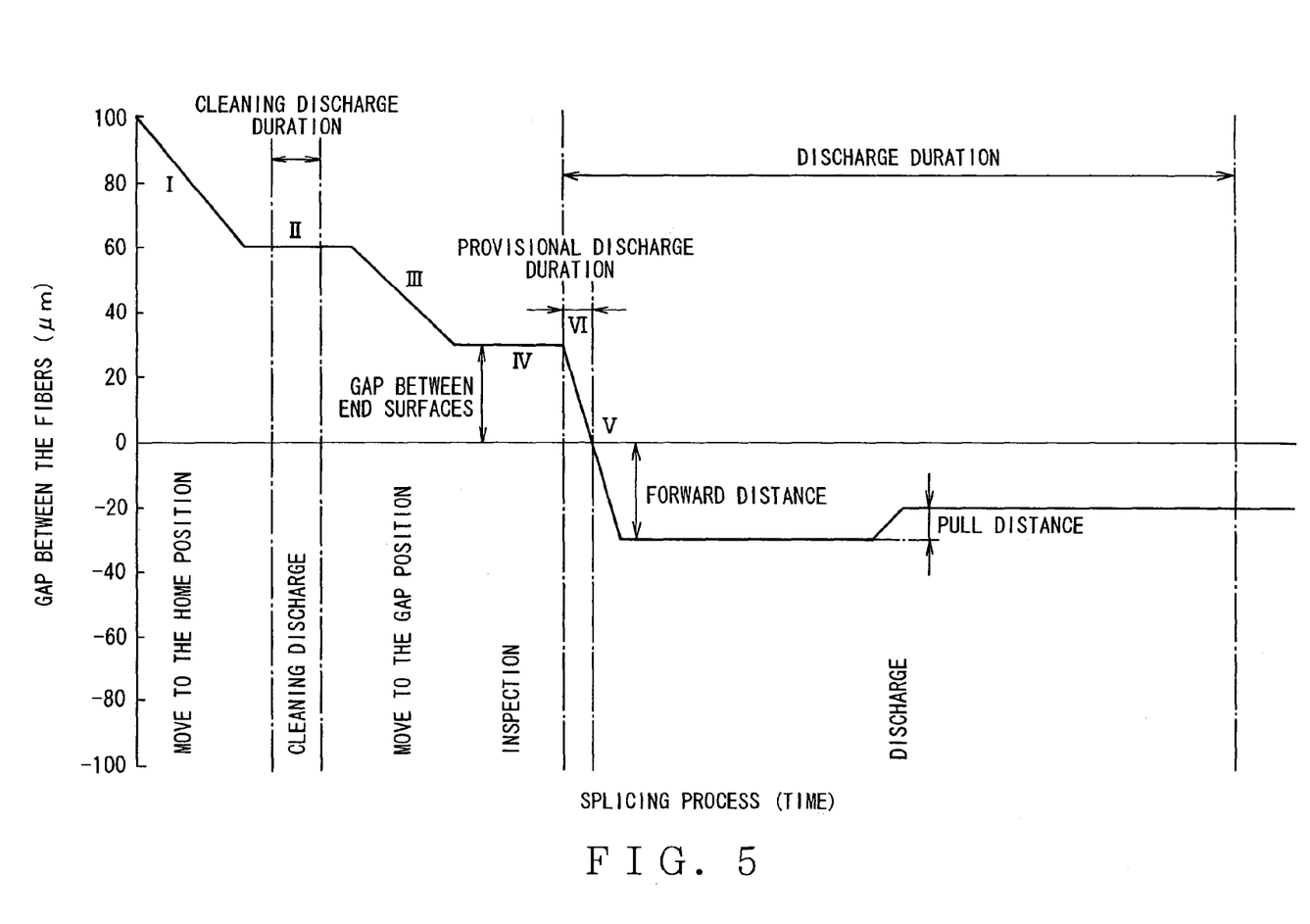
FIG. 5 shows the time series of an optical fiber's movement in the apparatus for producing a fixed value optical attenuating splice as shown in FIG. 3.

This cleaning arc operates to 1) blow off dust that has adhered to the fiber end faces and the circumferential surface near the ends of the bare fibers and; 2) deform the fiber end faces and create a nonuniform MFD area for a short distance in the direction of the optical axis.

In order for the cleaning arc to deform the fiber end faces f1 and f2 of the bare fibers F1 and F2, the apparatus 1 uses a cleaning arc that differs from a standard cleaning arc in that it has a higher discharge intensity or/and longer discharge duration applied to the fibers.

If the diameters of the fiber cores C1 and C2 of the bare fibers F1 and F2 are small, the discharge duration is set long with low intensity in order to achieve the desired splice loss. On the other hand, if the diameters of the fiber cores C1 and C2 of the bare fibers F1 and F2 are large, the discharge duration is set short with a relatively high discharge intensity.

For example, in the case of standard single mode optical fiber categorized as ITU-T standard G.652, which has an 8.8 micro-meter MFD and 125 micro-meter cladding diameter, the cleaning arc discharge duration is 0.3~2.0 seconds, depending on the targeted splice loss, instead of the nominal values of 0.1~0.3 seconds used for normal cleaning, and the relative value of the discharge intensity is 4 (i.e., four times higher intensity than that of a normal cleaning discharge). Furthermore, the gap between the surfaces of the spliced bare fibers, F1 and F2, is set to 30 microns as opposed to the 11 microns nominal value for normal splicing.

In the table of cleaning discharge patterns stored in NVM 25, the relative intensity of the cleaning discharge is set to be in a range of 1~5 and the discharge duration is set to be in a range of 0.3~30 seconds.

When the cleaning arc is finished, the end faces of the now-deformed bare fibers F1 and F2, still set in holders 3 and 5 are moved to the next position taking a prior inspection of the fiber end faces and surfaces near the fiber end face, for fiber inspection, by motors 11 and 13 and sliders 7 and 9 (in step III as shown in FIG. 5). At this point, the ends of the bare fibers F1 and F2 which were deformed by the cleaning arc process have cooled and solidified, and the CPU of apparatus 1 signals the splicing unit to perform a fiber inspection on that point (in step IV as shown in FIG. 5).

The next sequence of steps comprises the main part of the optical fiber fusion splicing process for splicing the fibers together in step V as shown in FIG. 5. In this step, apparatus 1 carries out the fusion splice of deformed fibers F1 and F2 according to the protocol of the standard fusion splice procedure. Relevant parameters that affect the optical performance of the splice include the fusion arc discharge intensity, the fusion arc discharge duration, the forward distance and the pull distance. For making the attenuation splice, these parameters and patterns are called from NVM 25 where each parameter and pattern optimized for achieving the targeted splice losses have been stored.

During the actions of step V, the ends f1 and f2 of the deformed bare fibers F1 and F2 are overlapped with each other by the forward distance called from NVM 25. Then after a waiting period, the duration of which is called from NVM 25 as the time before pull parameter, the fibers F1 and F2 are pulled away from each other by the pull distance, the value of which is also called from NVM 25. This function completes the fusion splicing of the bare fibers F1 and F2. The spliced region of the fibers, which is called part J, contains the region of the core which was, as previously described, deformed by the cleaning arc.

Figure 6:
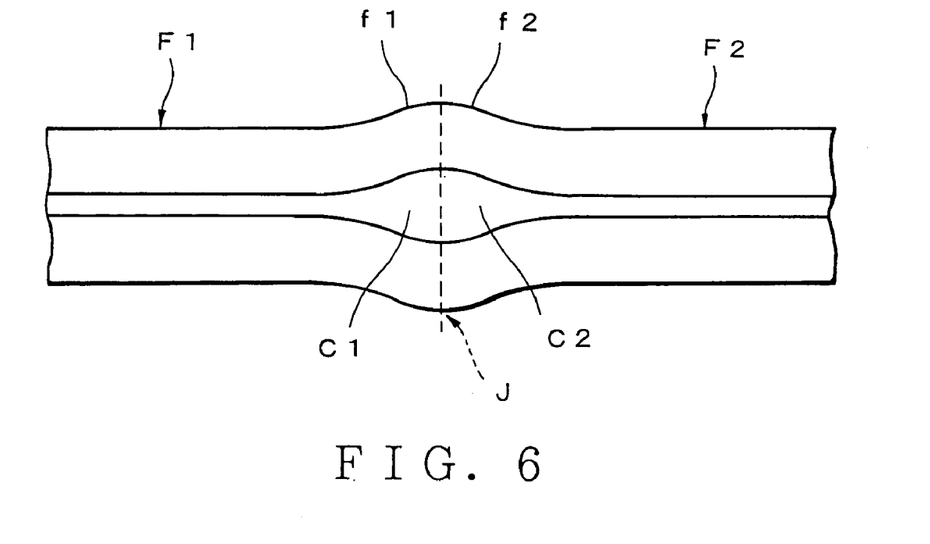
FIG. 6 shows an enlarged cross sectional diagram of a part of a bare fiber after fusion splicing to make an optical fixed attenuator according to the present invention.

Following the formation of the fusion-spliced part J, this part J with the other parts of the fibers F1 and F2 are taken out of holders 3 and 5. As a final process, the fibers are cut to length according to needs, and inserted into the desired packaging so as to obtain an optical fixed attenuator.

The optical fixed attenuator produced as above by the apparatus 1 according to the above procedure includes the region of non-uniform MFD produced by the cleaning arc, as well as adjacent regions whose MFD was not deformed. This non-uniform MFD area is actually a very short segment of the fibers F1 and F2, but it has very high attenuation enabling its use as an optical fixed attenuator.

Once the ends f1 and f2 of the bare fibers F1 and F2 are deformed by the action of the cleaning discharge, the characteristics of the fusion splice discharge are determined by the nature of the fiber deformation, other fiber characteristics, such as the original MFD, cladding diameter etc., and the targeted splice loss entered into the input section 21. For example, in the particular case of standard single mode ITU-T category G.652 fiber, the fusion splice program (which consists of the discharge intensity, discharge duration, forward distance and pull distance) is the same for all targeted splice loss values ranging from 0.05 dB to 4.0 dB, although the conditions of the cleaning arc will vary depending on the targeted splice loss.

Therefore, with the apparatus 1 as described in the above explanation of the present invention, it is possible to achieve the MFD difference between the ends f1 and f2 of the bare fibers F1 and F2 and other portions of the bare fibers F1 and F2 by the action of a higher-than-normal cleaning arc discharge. As previously mentioned, this cleaning discharge induced MFD nonuniformity in the direction of the optical axis occurs over a very short length of the fiber, although it has a large amount of optical attenuation. Consequently, even for large values of optical attenuation, the targeted attenuation can be attained with low cost equipment and does not require complicated or expensive technologies such as doping of the fiber core with light absorbing transition metal ions.

The low wavelength dependence of the optical attenuation of these splices makes them more widely usable than other types of fusion splice attenuators. Moreover, unlike other multi-arc processes which may require additional steps, such as that described in Japanese Patent Application #2000-131625, the process described herein for producing the attenuating splice does not require the addition of any steps beyond those of the normal splicing protocol since the first arc discharge to be executed is actually the cleaning discharge step.

In the particular illustration of our invention as described above, the MFD deformation process is executed as part of the cleaning discharge step. However, the timing of the process of deforming the ends f1 and f2 of the bare fibers F1 and F2 is not limited to be coincidental with the cleaning discharge step. The primary requirement is that the MFD deformation process is executed before the main fusion splicing process, referred to step V shown in FIG. 5.

As a particular example of an alternative option for the MFD deformation process, the pre-arcing step (step V1 shown in FIG. 5) can be used for deforming the MFD of ends f1 and f2 of the bare fibers F1 and F2. In this case, the intensity of the prearcing discharge will be set higher than that of the standard process with or without longer pre-arcing discharge duration. In this case, the parameter-setting step of prearcing will be executed in the step S7 and S9 shown in FIG. 4. By employing the pre-arc step in this manner, it is possible to generate the same MFD deformation as can be obtained with the cleaning discharge process described above.

As a further generalization of the invention, in the invented splice process and apparatus for making an optical fixed attenuator described above, the apparatus 1, which contains the input section 21 and NVM25 for storing the parameters of the cleaning discharge and the main fusion discharge, may be omitted. In this case, it is necessary to set each parameter, such as the cleaning discharge intensity and duration, the prearcing discharge intensity and duration, the gap between the bare fibers F1 and F2 etc., manually as per the specifics of this invention.

While the foregoing description includes details that will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by claims appended hereto and that the claims be interpreted as broadly as permitted by the prior art.

What is claimed is:

1. An optical fixed attenuator comprising:
   two optical fibers cojoined axially by fusion splicing following deformation of the fiber core and fiber mode field diameter (MFD), the mode field diameter (MFD) in a vicinity of each endface of the two optical fibers being controlled by said deformation, wherein the optical fixed attenuator is produced by using:
   calculating means for calculating the amount of deformation of the fiber core and mode field diameter (MFD) corresponding to a desired splice loss in advance of the deformation; and
   deformation means for deforming the fiber core and mode field diameter (MFD) in dependence upon the calculated amount to achieve the desired splice loss.

2. The optical fixed attenuator as recited in claim 1, wherein a cleaning arc function of a splicing machine is used to produce the deformation of the fiber core and mode field diameter (MFD) in a vicinity of the fiber endfaces so as to be different from the other parts of the fibers prior to fusion splicing.

3. The optical fixed attenuator as recited in claim 1, wherein a prearc function of a splicing machine is used to melt the fiber end faces prior to splicing, wherein a prearc level is controlled to achieve the specific splice loss by deforming the fiber core and mode field diameter (MFD) of the fiber in a vicinity of the end faces of the fibers so as to be different from that of the other parts of the fibers before fusion splicing.

4. The optical fixed attenuator as recited in claims 2 or 3, wherein the amount of the deformation of the fiber core and mode field diameter (MFD) required to achieve the specific splice loss is calculated on the basis of a correlation that exists between the amount of the deformation of the fiber core and mode field diameter (MFD) in the vicinity of the fiber end faces and splice loss.

5. An apparatus for producing attenuator splices comprising:
   a means for moving a first fiber core to form a gap between an end face of the first fiber core and an end face of a second fiber core, and for moving the first fiber core toward the second fiber core to remove the gap; and
   a plurality of electrodes performing a cleaning arc function by discharging an amount of cleaning arc which can be controlled to deform a fiber core and mode field diameter (MFD) in a vicinity of the end faces of the fibers so as to be different from that of the other parts of the fibers before the fusion splicing to achieve a specific splice loss, the electrodes performing the cleaning arc function when the end faces are spaced apart by the gap, the electrodes performing a fusion arc discharge for the fusion splicing when the gap is removed;
   wherein the amount of the cleaning arc is computed in advance in dependence upon a deformation quantity required to attain a desired optical attenuation;
   wherein the fusion arc discharge intensity is computed in advance in dependence upon the specific splice loss desired to exist after the fusion splicing, wherein the amount of the cleaning arc is different from the fusion arc discharge intensity.

6. The apparatus as recited in claim 5 for producing the attenuator splices, further comprising:
   a means for performing the computing of the amount of the cleaning arc discharge required to deform the fiber core and mode field diameter (MFD) of the end faces of the fibers to the desired amount before fusion splicing on the basis of a correlation that exists between an amount of the deformation of the fiber end faces and splice loss, and
   a means for adjusting the characteristics of the cleaning arc discharge as computed by the means for computing the amount of the cleaning arc discharge.

7. The apparatus as recited in claim 5 or 6,
   said plurality of electrodes melting the end faces of the fibers with a pre-arcing function which can be controlled to deform the fiber core and mode field diameter (MFD) of the fiber in the vicinity of the end faces of the fibers so as to be different from that of the other part of the fiber before fusion splicing to achieve the specific splice loss.

8. The apparatus as recited in claim 7 further comprising:
   a means for computing the characteristics of the prearcing discharge required to deform the fiber core and mode field diameter (MFD) in the vicinity of the end faces of the fibers before fusion splicing to an amount determined on the basis of a correlation that exists between the amount of deformation of the fiber end faces and the splice loss, and a means for adjusting the characteristics of the prearcing discharge as computed by the means for computing the characteristics of the prearcing discharge.

9. An optical fixed attenuator formed by fusion splicing ends of two optical fibers to each other and disposed in an optical signal transmission line so as to manage light intensity of an optical signal being transmitted in the optical signal transmission lines to a constant value, wherein the optical fixed attenuator is formed by fusion splicing said ends of two optical fibers to each other, each said end being deformed in advance by an amount of arc computed in advance in dependence upon a deformation quantity required to attain a desired optical attenuation, so that a mode field diameter of each said end is different from a mode field diameter of a portion of the optical fiber except said end, and quantity of the deformation of said end introduced in advance is set to be a quantity required to attain a specific attenuation after the fusion splicing, wherein a fusion arc discharge intensity for the fusion splicing is computed in advance in dependence upon splice losses desired to exist after the fusion splicing, wherein the amount of the arc is different from the fusion arc discharge intensity.

10. A method for producing an optical fixed attenuator comprising:

moving a first fiber to form a gap between end surfaces of a first fiber and a second fiber;

performing an electric discharge step for removing dust adhered on each of the end surfaces and their vicinity when the end surfaces are spaced apart by the gap and before the ends of the two optical fibers are fusion spliced to each other so as to form the optical fixed attenuator, wherein quantity of the electric discharge for removing dust is computed in advance and is controlled to be a quantity required to deform said ends of the optical fibers in advance so that a mode field diameter of each said end of the optical fiber is different from a mode field diameter of a portion of the optical fiber except said end and each said end is deformed with a quantity of deformation required to attain a specific attenuation after the fusion splicing between said ends of the optical fibers;

moving the first fiber toward the second fiber to remove the gap; and performing a fusion arc discharge step for the fusion splicing when the first fiber is moved toward the second fiber to remove the gap, wherein the fusion arc discharge intensity is computed in advance in dependence upon splice losses desired to exist after the fusion splicing, wherein the quantity of the electric discharge is different from the fusion arc discharge intensity.

11. A Method for producing an optical fixed attenuator comprising:

moving a first fiber to form a gap between ends of a first fiber and a second fiber;

performing a preheating step for melting the ends of the two optical fibers before said ends of the two optical fibers are fusion spliced to each other so as to form the optical fixed attenuator, wherein quantity of the preheating is computed in advance and is controlled to be a quantity required to deform said end of the optical fiber in advance so that a mode field diameter of each said end of the optical fiber is different from a mode field diameter of a portion of the optical fiber except said end and each said end is deformed with a quantity of deformation required to attain a specific attenuation after the fusion splicing between said ends of the optical fibers;

moving the first fiber toward the second fiber to remove the gap; and performing a fusion arc discharge step for the fusion splicing when the first fiber is moved toward the second fiber to remove the gap, wherein the fusion arc discharge intensity is computed in advance in dependence upon splice losses desired to exist after the fusion splicing, wherein the quantity of the preheating is different from the fusion arc discharge intensity.

12. The method for producing an optical fixed attenuator according to claim 10, wherein the quantity of deformation required to attain a specific attenuation is computed on the basis of a correlation between a quantity of deformation of said end calculated in advance and an attenuation due to the fusion splicing for a spliced part of said ends.

13. The method for producing an optical fixed attenuator according to claim 11, wherein the quantity of deformation required to attain a specific attenuation is computed on the basis of a correlation between a quantity of deformation of said end calculated in advance and an attenuation due to the fusion splicing for a spliced part of said ends.

14. An apparatus for producing an optical fixed attenuator, by which an electric discharge is carried out for removing dust adhered on each end surface and its vicinity of two optical fibers when the two optical fibers are spaced apart by a gap, and thereafter the gap is removed and ends of the two optical fibers are fusion spliced to each other by a fusion arc discharge so as to form the optical fixed attenuator, wherein quantity of the electric discharge for removing dust is set adjustable in a range including at least a quantity required to deform each said end of the optical fiber in advance so that a mode field diameter of each said end of the optical fiber is different from a mode field diameter of a portion of the optical fiber except said end and each said end is deformed with a quantity of deformation required to attain a specific attenuation after the fusion splicing between said ends of the optical fibers, wherein the fusion arc discharge intensity is computed in advance in dependence upon splice losses desired to exist after the fusion splicings wherein the quantity of the electric discharge is different from the fusion arc discharge intensity.

15. The apparatus for producing an optical fixed attenuator according to claim 14 comprising:

first computing means for computing the quantity of the electric discharge for removing dust required to deform said each end of the optical fiber with the quantity of deformation required to attain the specific attenuation on the basis of a correlation between a quantity of deformation of said end calculated in advance and an attenuation due to the fusion splicing for a fusion spliced part of said ends; and first adjusting means for adjusting quantity of the electric discharge for removing dust to the quantity of the electric discharge computed by the first computing means.

16. An apparatus for producing an optical fixed attenuator, by which a preheating is carried out when the two optical fibers are spaced apart by a gap for melting ends of two optical fibers before the gap is removed and said ends of the two optical fibers are fusion spliced to each other by a fusion arc discharge so as to form the optical fixed attenuator, wherein quantity of the preheating is set adjustable in a range including at least a quantity required to deform said end of the optical fiber in advance so that a mode field diameter of each said end of the optical fiber is different from a mode field diameter of a portion of the optical fiber except said end and each said end is deformed with a quantity of deformation required to attain a specific attenuation after the fusion splicing between said ends of the optical fibers, wherein the fusion arc discharge intensity is computed in advance in dependence upon splice losses desired to exist after the fusion splicing, wherein the quantity of the preheating is different from the fusion arc discharge intensity.

17. The apparatus for producing an optical fixed attenuator according to claim 16 comprising:

second computing means for computing the quantity of the preheating required to deform said end of the optical fiber with the quantity of deformation required to attain the specific attenuation on the basis of a correlation between a quantity of deformation of said end calculated in advance and an attenuation due to the fusion splicing for a fusion spliced part of said ends; and second adjusting means for adjusting said quantity required to deform said end of the optical fiber in advance to the quantity of the preheating computed by the second computing means.

* * * * *